(12) United States Patent
Feygin et al.

(10) Patent No.: US 7,364,905 B2
(45) Date of Patent: *Apr. 29, 2008

(54) APPARATUS AND METHOD FOR HIGH THROUGHPUT ANALYSIS OF COMPOUND-MEMBRANE INTERACTIONS

(75) Inventors: Ilya Feygin, Mountainside, NJ (US); Rafail Kushak, Brookline, MA (US)

(73) Assignee: TechElan, LLC, Mountainside, NJ (US)

( * ) Notice: Subject to any disclaimer, the term of this patent is extended or adjusted under 35 U.S.C. 154(b) by 872 days.

This patent is subject to a terminal disclaimer.

(21) Appl. No.: 10/139,766

(22) Filed: May 6, 2002

(65) Prior Publication Data

US 2003/0199096 A1 Oct. 23, 2003

Related U.S. Application Data

(60) Provisional application No. 60/334,332, filed on Nov. 29, 2001.

(51) Int. Cl.
*G01N 33/00* (2006.01)

(52) U.S. Cl. .................... 436/8; 435/297.1; 435/297.5; 422/50; 422/58; 422/68.1

(58) Field of Classification Search ............. 435/297.1, 435/297.5; 73/38, 64.47; 422/50, 58, 68.1
See application file for complete search history.

(56) References Cited

U.S. PATENT DOCUMENTS

| | | | |
|---|---|---|---|
| 3,590,634 A * | 7/1971 | Pasternak et al. .............. | 374/54 |
| 3,915,652 A * | 10/1975 | Natelson ....................... | 422/65 |
| 3,980,250 A | 9/1976 | Persson | |
| 4,744,900 A | 5/1988 | Bratt | |
| 4,889,626 A | 12/1989 | Browne | |
| 4,911,713 A | 3/1990 | Sauvage et al. | |
| 5,183,760 A * | 2/1993 | Sweetana et al. ......... | 435/284.1 |
| 5,591,636 A * | 1/1997 | Grass ....................... | 435/287.1 |
| 5,738,826 A * | 4/1998 | Lloyd ......................... | 422/102 |
| 6,521,191 B1 * | 2/2003 | Schenk et al. .............. | 422/102 |
| 2003/0104610 A1 * | 6/2003 | Feygin et al. ............. | 435/287.1 |
| 2003/0199096 A1 | 10/2003 | Feygin et al. | |
| 2004/0082071 A1 * | 4/2004 | Feygin .......................... | 436/8 |

OTHER PUBLICATIONS

Harvard Apparatus Catalog, "Cell Biology Section," pp. M78-M82 (c 2000).

* cited by examiner

*Primary Examiner*—Jill Warden
*Assistant Examiner*—Samuel P Siefke
(74) *Attorney, Agent, or Firm*—Demont & Breyer LLC

(57) ABSTRACT

An article and method for high throughput and a high content investigation of compound interactions with live tissue or its substitutes under controlled conditions during compound absorption and related processes. In some variations of the illustrative embodiment, the article is a multi-chamber enclosure having at least two chambers separated by a membrane. Membranes can be prepared from live epithelial tissue or from an artificial material with or without attached cells from cell-line cultures. Each chamber is advantageously connected to a fluidic-control system by tubes that pass through a feed fitting. In addition to coupling the chambers with the fluidic-control system, the feed fitting, which is spring-biased, provides a sealing force to seal the enclosure. In some variations, one or more multi-chamber enclosures are installed in a mother chamber, which provides controlled environmental conditions. Operation of the article includes automatic introduction of compounds, buffers, and gases into the chambers, establishing reaction conditions inside the chambers, and individually sampling from the chambers.

24 Claims, 8 Drawing Sheets

APPARATUS AND METHOD FOR HIGH THROUGHPUT ANALYSIS OF COMPOUND-MEMBRANE INTERACTIONS

STATEMENT OF RELATED APPLICATIONS

This case claims priority of U.S. Provisional Application Ser. No. 60/334,332, filed Nov. 29, 2001, entitled "Article and Method for High-Throughput Analysis," which is also incorporated by reference herein.

FIELD OF INVENTION

The present invention relates to high-throughput investigation and screening of compound interactions with live tissue or tissue substitutes.

BACKGROUND OF THE INVENTION

Aggressive research in genomics, functional proteomics and drug discovery has resulted in a large increase in the number of chemical entities ("leads") that have a potential for therapeutic activity. The leads are typically pruned in "pre-clinical screening" studies to select promising candidates for final "clinical studies." Due to the large number of leads to be screened, the pre-clinical screening process has become a bottleneck in the drug discovery process.

During pre-clinical screening, sequential pharmacological transformations of the leads, in conjunction with an organism (e.g., cells, tissues, model animals, etc.,) are evaluated. The evaluation that is typically performed during pre-clinical screening is known as "ADMET" or sometimes "ADME Tox," which is an acronym for Absorption, Distribution, Metabolism, Excretion and Toxicology. The absorption properties of leads are particularly important, and, as discussed later in this section, are particularly problematic to test.

There are generally two approaches to the pre-clinical screening of leads—in vivo testing and in vitro testing using artificial membranes (immobilized artificial membranes) or cell-based permeability methods. In vivo testing is performed within a living organism, while in vitro testing is performed outside of a living organism. Of these two approaches, in vivo testing provides a more accurate analysis of compound absorption and bio-availability during pre-clinical pharmaco-kinetic studies. Unfortunately, the logistics of animal-based studies makes them extremely expensive and time consuming. Furthermore, in vivo studies cannot provide the speed necessary to support high-throughput screening of drug candidates. Even the recently developed "cassette method," wherein multiple compounds (about five to ten) are combined and administered to a single animal, cannot provide the desired productivity. (See, J. Berman et al., J. Med. Chem. 40:827-829 (1997); Dietz et al., U.S. Pat. No. 5,989,918.)

Consequently, the focus in high-throughput screening of drug candidates is on various in vitro techniques (and even computer "in silico" modeling methods). Unfortunately, absorption is a difficult process to model and evaluate using in vitro testing. Specifically, absorption deals with the transportation of compounds through live membranes (e.g., tissues, etc.)—a situation that is difficult to re-create outside of a living organism under test conditions. Absorption studies, therefore, have been at the forefront of current drug-discovery efforts. These efforts have been directed at the development of instrumentation and methodologies that will accelerate the pace at which absorption studies can be performed. Specifically, the thrust is to accelerate absorption studies to the speed at which the other steps of the drug discovery process are being conducted.

One of the first methods developed for in vitro absorption studies was the "everted sac" technique (T. H. Wilson & G. Wiseman, J. Physiol. 123:116-125 (1954)). The everted sac is an everted (i.e., mucosal surface turned inside-out) segment of intestine, typically 3 to 5 centimeters in length, that is filled with oxygenated buffer solution (i.e., serosal solution contacting the serosal surface) and tied at both ends with sutures. The everted sac is placed in a similar solution (i.e., mucosal solution) and is incubated at 37° C. with continuous aeration. The compound under test may be added to mucosal or serosal solutions depending on what type of transport is being studied (i.e., mucosa→serosal or serosal→mucosal). After incubation is completed, the concentration of the transported compound is estimated in the solutions on both sides of the intestine and in the intestinal mucosa. This simple, reproducible and inexpensive method is used for studying mechanisms of compound transport through the intestine in various regions, as well as for studying compound metabolism by intestinal mucosa (E. S. Foulkes, Proc. Soc. Exper. Biol. Med. 211:155-162 (1996)).

There are, however, certain disadvantages to the everted-sac technique, including low tissue viability and rapid (thirty minute) onset of histological damage in salt mixtures (R. R. Levine et al., Eur. J. Pharm. 9:211-219 (1970)). Another drawback of the technique is that while the serosal chamber, being a closed system, is appropriate for short-term studies, it might not be suited for the evaluation of molecular kinetics during longer-term studies or when investigating drugs that have a high absorption rate. Furthermore, the everted-sac technique is not suited to high throughput analysis.

Another well-known technique and apparatus for in vitro study of absorption is the "Ussing chamber." The Ussing Chamber, like the everted intestinal sac, can be used for investigating the transport of molecules and for measuring electrical parameters at specific sites of the intestine, as well as for the evaluation of intestinal metabolism.

Originally developed for measuring the electric potential across frog skin, the Ussing Chamber consists of two chambers—a donor chamber and a receiver chamber. To measure absorption of a compound, a tissue (e.g., whole intestinal tissue or tissue that is stripped from muscular and serosal layers) is placed between the chambers. The chambers are filled with buffer solutions, wherein the compound under investigation is added to the solution within the donor chamber. After incubation (i.e., exposure of the tissue to the compound-containing solution for a certain length of time and at certain conditions of temperature, pH, etc.), aliquots are taken from the receiving chamber or from both chambers, and then analyzed. (H. H. Ussing & K. Zehran. Acta Physiol. Scand. 23:110-127 (1951)). Many modifications of the classical Ussing chamber are used for oral permeability studies. (See, e.g., U.S. Pat. Nos. 4,667,504, 5,183,760, 5,591,636, and 5,599,688.)

There are a variety of drawbacks to the Ussing Chamber. One drawback is the uncertain tissue viability during incubation in simple salt buffers. In particular, it has been demonstrated that after thirty minutes incubation of intestinal mucosa in buffer solution, fifty percent to seventy-five percent of epithelium disappears and, after one hour, total disruption of the epithelial border can occur. (See, Levine et al., Eur. J. Pharm. 9:211-219, (1970)). Even after only twenty minutes of intestinal tissue incubation in a simple salt medium, severe intestinal edema and disruption of epithelium has been observed (M. Mayersohn et al., J. Pharm. Sci. 60:225-230 (1971)).

A second disadvantage of the Ussing Chamber is that it is inappropriate for high-throughput studies. In particular, when using excised tissue samples (as opposed to using cell-culture inserts, e.g., Transwells™), each intestinal strip dissection and mounting takes between two to four minutes (M. Field et al., Amer J. Physiol. 220:1388-1396 (1971)). This makes simultaneous preparation of multiple tissue samples for absorption problematic.

A third disadvantage of the Ussing Chamber is that the ability to obtain samples from the donor chamber and the receiver chamber is limited. In particular, the chambers are filled with fluid (i.e., gas or liquid) that is sampled from each of the chambers as desired. There is no ability to sample fluids from, or deliver fluids to, specific regions within the chambers (e.g., near the tissue sample, etc.).

A relatively new technique, called the "cell-culture" technique, is capable of study absorption at substantially higher throughputs. This technique has already been adopted for automated high-throughput compound screening and optimization. Unlike most in vitro models, the cell culture method does not require the use of the animals, but, rather, uses specific cell lines that are grown in sterile conditions.

One of the key cell lines used for absorption studies is the Caco-2 cell line. Originating from human colon adenocarcinoma, the Caco-2 cells, after confluency, possess many of the functional and morphological characteristics of normal differentiated enterocytes. Multiple studies show that this method provides comparative information on absorption of different drug molecules.

The Caco-2 cells are cultured in a specially-constructed cell-culture plate. The plate consists of an inner well that is disposed within an outer well. The bottom of the inner well is a semi-permeable membrane. The Caco-2 cells are grown to confluency on the semi-permeable membrane. To evaluate transport, a compound is added to a medium above the Caco-2 cells (i.e., the compound is added to the inner well). Uptake of the compound is determined by quantifying the amount of the compound in the medium on the opposite side of the semi-permeable membrane (i.e., in the outer well).

There are a number of drawbacks to the cell-culture technique using Caco-2 cells. One drawback is the cancerous nature of these cells, which might be indicative of altered cellular properties. Furthermore, it takes several weeks to grow the cells. This delays the beginning of absorption tests and increases the risk of bacterial or fungal contamination of the culture (see, L. Barthe et al., Europ. J. Drug Metab. Phatmacokinet. 23:313-323 (1998); A. P. Li et al., High Throughput Screening. Jan. 6-9 (2001)). Caco-2 cells might also be phenotypically unstable and change their enzyme activity and transporter expression with passage number (K. M. Hillgren et al., Med Res Rev 15:83-109 (1995)).

Another major disadvantage of the cell-culture technique is the slow compound absorption rate. Caco-2 cells are between twenty to forty times less permeable than normal human colon cells (P. Artursson et al., Pharm. Res. 10:1123-1129 (1993)). Other studies showed that for mannitol, the rate of permeation is fifty to three hundred and sixty times lower through the cell mono-layer than through the gut (L. Barthe et al., Europ. J. Drug Metab. Phatmacokinet. 23:313-323 (1998)).

Furthermore, the usefulness of Caco-2 cells has been limited because they do not express appreciable quantities of bio-transformation enzymes, which are present in human small-bowel epithelial cells. This drawback was overcome recently by treating Caco-2 cells with vitamin D analog (see U.S. Pat. No. 5,856,189). Some believe, however, that regardless of cell line, "the constraints in the methodology surrounding preparation and use of these cells prevent them from being classified as truly high-throughput screens for absorption" (M. H. Tarbit & J. Berman. Curr. Opin. Che. Biol. 2:411-416 (1998)).

The predominantly manual techniques described above cannot support high-throughput programmable operations, nor provide ease of setup and control functions. Yet, there is a pressing need to implement high-speed screening of compound-to-membrane interactions in many industries and many areas of research. In the context of pharmacological studies, it represents a large area of research in oral, dermal, pulmonary, nasal, buccal, corneal, and vaginal drug absorption.

Notwithstanding the many screening techniques available, a need therefore remains for a device and method that provides at least some of the following advantageous characteristics:

Provides high-throughput screening ("HTS") with low cost of preparation, operation and maintenance.

Provides high-content screening ("HCS"), which allows multiple in-process sampling and testing that is necessary for time-based kinetic studies.

Enables the use of live tissue as the most relevant substrate for absorption/penetration studies.

Enables the use of artificial membranes of various types when necessary.

Preserves tissue viability by accelerating all steps of the experiment including loading, conditioning and testing.

Provides simultaneous sample loading of all test chambers in order to reduce time and assure valid comparative analysis.

Utilizes small tissue samples, allowing parallel preparation of large numbers of samples from close locations of the same organ, thereby decreasing the effect of absorption gradients due to tissue variation along the small intestine and reducing the required number of donor animals.

Provides selectable and stable testing conditions, which are closely matched in all test chambers of the device.

Maintains, if necessary, an accepted industry-standard number of independent investigative chambers in multiples of 8 or 12 (e.g., 24, 48, 96, etc.).

Maintains in vitro conditions that closely match in vivo conditions, and provides the ability to monitor, alter and "in-process" control these conditions (e.g., temperature, pH, oxygen, etc.).

Has a small physical size for saving bench-top real estate, and is physically adapted for expansion and for the multiplexing of testing chambers.

Provides ease of operation including loading, sampling, cleaning, servicing and maintaining.

SUMMARY OF THE INVENTION

The present invention provides an apparatus and method that avoids some of the drawbacks of the prior art and possesses at least some of the advantageous characteristics listed above. Among other capabilities, the illustrative embodiment of the present invention provides high-throughput and high-content investigation of compound interactions with live tissue or tissue substitutes during compound absorption and related processes. The interactions occur in a controlled environment that closely resembles in-vivo conditions. The invention facilitates the development of new compounds (e.g., drugs, nutrients, nutraceuticals, cosmetics, cosmeceuticals, etc.) for oral, dermal, pulmonary, nasal, buccal, scleral or vaginal application, as well as toxicological evaluation of xenobiotics.

An apparatus for high-throughput analysis in accordance with the illustrative embodiment includes at least one membrane-holding multi-chamber enclosure that is capable of interfacing (e.g., via transfer of fluids, electronically, etc.) with a variety of preparative devices and analytical instrumentation.

Membranes for use in conjunction with the illustrative embodiment of the present invention include a thin sheet of live epithelial tissue such as gastrointestinal, buccal, nasal, corneal, vaginal, lung, and skin or an artificial membrane with or without attached cells from various cell-line cultures. Each individual chamber within the multi-chamber enclosure is advantageously connected to a fluidic-control system by means of conduits and tubes.

In some variations, a multi-chamber enclosure in accordance with the illustrative embodiment of the present invention includes two individual chambers that are interfaced with each other across the membrane. In some other variations, more than two chambers are present.

In some variations of a two-chamber multi-chamber enclosure, the enclosure is formed of two generally conical-shape housings. The housings are open at both ends. At one of the ends of each housing, there is a relatively larger opening ("larger aperture,") and at the other end there is a relatively smaller opening ("small aperture,") consistent with the generally conical shape of the housings. The housings are coupled to one another proximal to the large apertures. The membrane is disposed between the large apertures. With the membrane in place, two chambers are formed within the enclosure, wherein the interior volume that is circumscribed by each housing defines each chamber.

A feed fitting forcefully mates with the small aperture of each of the housings, advantageously disposed at opposite ends of the enclosure. The feed fitting is preferably spring-biased, such as by coupling a spring-biasing element to it. This arrangement provides a number of beneficial features including, among others:

A way to seal the interface between the feed fitting and the relatively smaller opening in each conical-shaped member.

A way to introduce one or more tubes into each chamber (i.e., through the feed fittings). The tubes, which enter the feed fitting bundled within a conduit, support fluid (i.e., liquid and/or gas) exchange between the chambers and the fluid control system.

Mechanical and fluidic integrity to the entire chamber enclosure.

Individual chambers are advantageously internally equipped with a device or arrangement that guides and fixes the plurality of tubes at desired locations in the vicinity of the membrane. Positioning the end of the tubes near the membrane provides efficient delivery and sampling of solvents and buffers, as well as perfusion, gas and fluidic purging and other processes. The other end of each tube is individually connected to the fluidic-control system. The tubes are designed to quantitatively deliver liquids, gases and aerosols of choice, to and from each individual chamber. The chambers can be fully filled with solvent, or the membrane can be sprayed and coated with a high viscosity compound that is introduced as aerosol.

The fluidic control system, which is advantageously programmable, interconnects individual chambers with supply reservoirs and sampling receivers, and/or directly with various analytical instruments and preparative devices. The movement of fluids and gases through the tubes can be controlled by means of pressurization, vacuum or positive-displacement forces.

In some variations of the illustrative embodiment, individual chambers are equipped with one or more electrodes for introducing and/or measuring electric potential across the membrane. The electrodes are electrically isolated and introduced into individual chambers through the openings along with the tubes. The electrodes are advantageously terminated with pliable noble metal (e.g. platinum wire, etc.) and can be shaped and located in accordance with the desired function of applying or measuring electrical potentials or currents.

In some variations of the illustrative embodiment, a plurality of dual-chamber multi-chamber enclosures are mechanically coupled, side-by-side, to a frame. The frame advantageously has two spaced-apart rails against which the spring-biasing elements for each dual-chamber multi-chamber enclosure are referenced. Since the spring-biasing elements are mechanically coupled to the feed fittings, and the feed fittings are received, in at least some variations, on opposite ends of the enclosure, the enclosure is placed in compression by the opposing spring-biasing elements.

In some variations of the illustrative embodiment, a frame having a plurality of multi-chamber enclosures is installed into a mother chamber. The frame is advantageously rotatable, within the mother chamber, about an axis that is orthogonal to the long axis of each multi-chamber enclosure (i.e., each multi-chamber enclosure is capable of being "tilted"). This enables horizontal or vertical alignment of the membranes, as well as gravitational and centrifugal leveling of compounds if required by the investigative protocol (e.g., in a dermal application that models accelerated compound permeation through skin, etc.).

The mother chamber advantageously controls internal environmental conditions using, for example, a flow of one or more liquids, a flow of one or more gases, infrared heating, or other techniques that are customarily employed in various incubation and environmental chambers, or any combinations of all of the above.

In some embodiments, operation of the multi-chamber enclosure involves fully-controlled introduction of compounds, buffers, gases, or aerosols into individual chambers, as well as fully-controlled sampling of materials from any individual chamber. Sampling and inter-connecting the fluidic control system with analytical instrumentation is performed in known fashion, by any of a number of techniques, apparatuses and arrangements that are known to those skilled in the art.

The filling and evacuation of solvents, as well as agitation, purging and related functions that occur inside the multi-chamber enclosures are conducted by controlling the flow of solvents and gases through the tubes into and out of the individual chambers. In some embodiments, each individual chamber is equipped with gas/solvent escape vents, advantageously located at the top of each chamber, that enable free filling and evacuation of gases and solvents. As a function of the investigative process, individual chambers function either as a supply chamber or as a receiving chamber.

Rapid preparation and mounting of selected types of live tissues is a result of the relative ease with which membranes can be simultaneously installed into multiple individual chambers. Thus, for example, adjacent areas of intestine or other areas of gastro-intestinal tract, which have minimum tissue-property variations, can be investigated in parallel fashion. High-speed preparation is advantageous, if not essential, for sustaining high throughput for the entire absorption-testing process. High-speed preparation of test membranes also aids in maintaining tissue viability, which is necessary for obtaining reliable results with minimum variations due to altered or diminishing tissue properties. Tissue viability is inversely proportional to the time of its autonomous existence.

The multi-chamber enclosure enables the evaluation of compound fluxes through the membrane from an arbitrarily designated "supply" chamber to a "receiving" chamber and vice versa, and the evaluation of compound transformations within the individual chambers and the membrane. The multi-chamber enclosure is further useful for the analysis of, among other phenomena:
1. The mechanism of compound uptake (accumulation) in tissue.
2. The mechanism of compound transport through the tissue.
3. The kinetics of compound uptake and transport.
4. First-pass metabolism in tissue under investigation.
5. The cell excretion system: P-glycoprotein and its expression in the tissue.
6. Trans-membrane current and potential.
7. The effect of absorption inhibitors and enhancers.
8. Pharmacologic antagonism in toxicity studies.
9. Various compound (e.g., nutrients, drugs, nutraceuticals, cosmetics, cosmeceuticals, other xenobiotics) interactions during their absorption.

DETAILED DESCRIPTION

Figure 1:
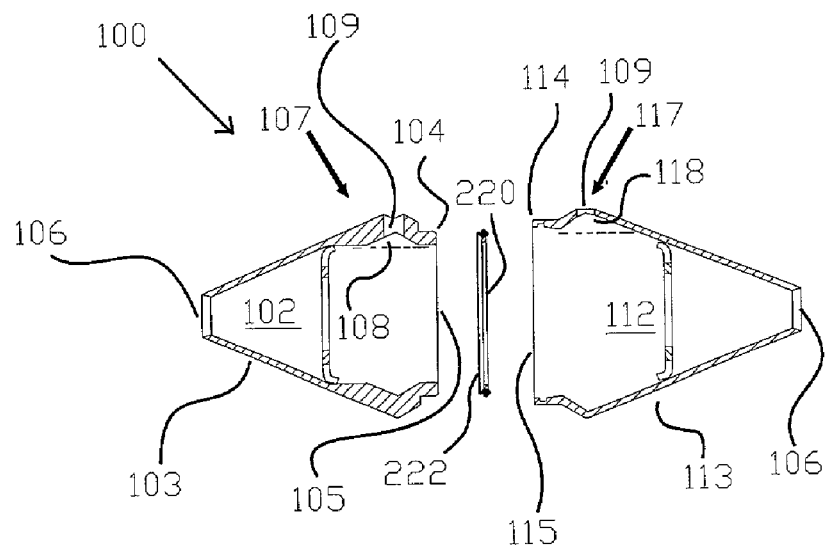
FIG. 1 depicts an exploded, cross-sectional side-view of a multi-chamber enclosure having two housings, which, in conjunction with a membrane, define two chambers, in accordance with the illustrative embodiment of the present invention.

The terms listed below are given the following definitions for use in this specification.

Absorption enhancer is a chemical entity (compound) that facilitates the absorption of a tested compound.

Absorption inhibitor is a chemical entity (compound) that inhibits the absorption of a tested compound.

Apical membrane is a part of the cell plasma membrane of polarized cells facing the external environment.

Baso-lateral membrane is a part of the cell plasma membrane covering the base and sides of the polarized cells.

Buccal means related to the mouth or hollow part of the cheek.

Communicates means that one element is able to receive information or material from another element. For example, an opening that communicates with a chamber is capable of receiving fluid from or delivering fluid to the chamber.

Confluency means that all cells in a tissue culture are in complete contact with other adjacent cells and no available substrate is left uncovered with cells.

Cosmeceutical is a cosmetic product whose active ingredients have a beneficial physiological effect in comparison with inert cosmetic. Examples of cosmeceuticals include, without limitation, vitamins, minerals, antioxidants and other biologically-active substances.

Coupled means directly or indirectly connected. In some cases, coupled elements do not physically contact one another. For example, two housings that do not touch one another because they are separated by a gasket, but otherwise collectively form an enclosure, are properly characterized as "coupled" under this definition. In other cases, two elements that are in physical contact with one another are properly characterized as "coupled" for the purpose of this specification.

Epithelial tissue is the tissue covering the surface of the skin and lining every canal, tract (e.g., gastrointestinal tract, etc.) and cavity that communicates with the external environment.

Enterocytes are absorptive cells of the small intestine.

First-pass metabolism is drug bio-transformation during its passage through the intestinal epithelium. This process can markedly decrease the amount of an administered drug that is actually available to the body.

Incubated means kept at constant conditions such as, for example, temperature, oxygenation, etc.

In vivo refers to biological processes that occur inside the body of a living organism.

In vitro refers to biological processes that occur outside the body (e.g., in a test tube, etc.).

Mechanically coupled means that a first element is capable of imparting a force to a second element, regardless of whether or not the two elements are in physical contact with one another. For example, consider a spring that is connected to a fitting that is, in turn, connected to a housing. It is proper, under this definition, to characterize the spring as being mechanically coupled to the housing.

Mucosal tissue (mucosa) is the moist membrane lining the surface of many tubular structures and cavities (e.g. mouth, esophagus, small intestine). Along with other types of cells, mucosal tissue contains cells that secrete mucus.

Nutraceutical is a nutritional supplement. Examples of nutraceuticals include, without limitation, vitamins, minerals, polyunsaturated fatty acids, antioxidants, probiotics and other biologically active substances.

P-glycoprotein is a membrane-localized drug-transport mechanism that has an ability to actively pump drugs out of a cell.

Pharmacologic antagonism means that one drug opposes the action of another drug (e.g., preventing it from combining with its receptor, etc.).

Sclera is a white fibrous outer layer of the eyeball.

Serosal membrane (serosa) is a smooth transparent membrane that lines certain large cavities of the body and that covers some of its organs (e.g., gastrointestinal tract, etc.).

Synthetic tissue or tissue substitute is a thin layer of artificial membrane having a selected permeability. It is used for compound permeability studies or as a substrate for cell attachment in tissue culture. Examples of synthetic tissue (membranes—I.F.) include, without limitation, nitrocellulose, nylon, polypropylene, other synthetic polymers, etc.

Xenobiotic is a foreign compound that is toxic, at some dose, to at least some living organisms. Examples of xenobiotics include, without limitation pesticides, herbicides, fungicides, and the like.

FIG. 1 depicts an exploded, cross-sectional side-view of a multi-chamber enclosure 100 having two chambers 102 and 112, in accordance with the illustrative embodiment of the present invention. In the illustrative embodiment, chambers 102 and 112 are defined by respective, generally conical-shape housings 103 and 113, in conjunction with membrane 222. Each of housings 103 and 113 has two open ends. More particularly, conical-shape housing 103 includes large aperture 105 and small aperture 106. Large aperture 105 is formed at marginal region 104 of conical-shape housing 103. Similarly, conical-shape housing 113 has large aperture 115 and small aperture 106. Large aperture 115 is formed at marginal region 114 of conical-shape housing 113.

Membrane 222, which is advantageously secured in membrane-holding assembly 220, is disposed between large aperture 105 of conical-shape housing 103 and large aperture 115 of conical-shape housing 113. Membrane 222 therefore separates and seals chambers 102 and 112 from one another. (Recall that FIG. 1 depicts an exploded view; when assembled, the gaps that are depicted in FIG. 1 between membrane-holding assembly 220/membrane 222 and the large apertures 105 and 115 do not exist.)

In some variations of the illustrative embodiment, membrane 222 is live tissue. For example, in oral absorption studies, intestinal tissue is used, or alternatively, the mucosa of intestinal tissue, stripped from underlying layers, can suitably be used. In other absorption studies, skin, buccal, nasal, pulmonary, corneal, vaginal or other tissues can be used. In further variations, the membrane is a tissue substitute (i.e., synthetic tissue), such as nitrocellulose, nylon, polypropylene, etc. In yet additional variations of the illustrative embodiment, the membrane is a mono-layer of cells from a cell line that is grown on a surface of a membrane.

Figures 2A, 2B, 2C:
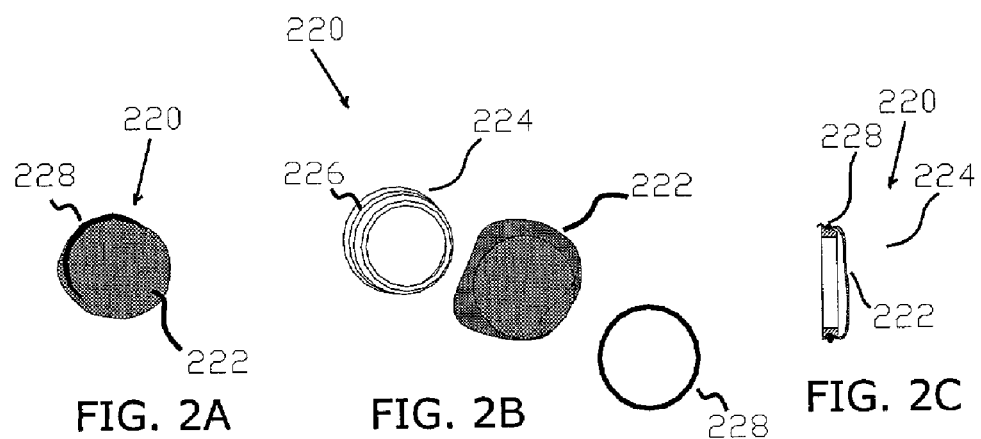
FIG. 2A depicts a view of a membrane-holding assembly, with membrane attached, for use in conjunction with the illustrative embodiment of the present invention.
FIG. 2B depicts an exploded view of the membrane-holding assembly of FIG. 2A.
FIG. 2C depicts a cross-sectional view of the membrane-holding assembly of FIG. 2B with O-ring fastener.

Referring now to FIGS. 2A (assembled view), 2B (exploded view), and 2C (cross-section of FIG. 2A), membrane-holding assembly 220 includes membrane-holding frame 224 and fastener 228 (e.g., O-ring, etc.). Membrane-holding assembly 220 receives membrane 222 in a diaphragm-like manner (e.g., as a drum head is received by the body of a drum, etc.). The membrane is held in place via fastener 228, which references itself through membrane 222 into groove 226 on membrane-holding frame 224.

Membrane 222 is advantageously prepared by positioning a tissue, such as an intestinal segment (free of Payer's patches) over one or more membrane-holding frames 224 and then fastening, cutting and trimming the intestinal segment to size. In the illustrative embodiment, membrane 222 is depicted as having a circular shape; however, in other embodiments, membrane 222 can have any shape that is suitable for cooperation with membrane-holding assembly 220. The size of membrane 222 depends on the investigative process. Typically, membrane 222 has a diameter that is typically in a range from about 0.25 inches to about 0.5 inches.

Figure 3A:
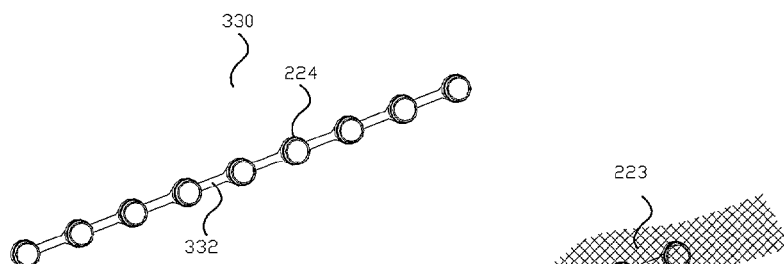
FIG. 3A depicts a cassette having a plurality of individual membrane-holding frames.
Figure 3B:
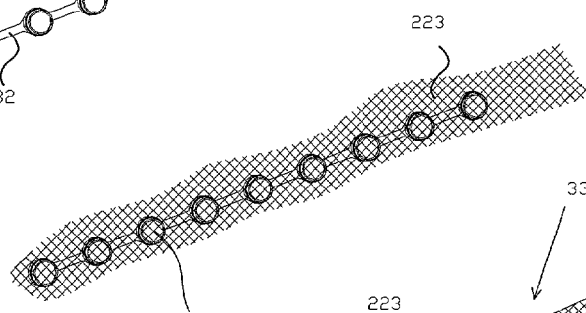
FIG. 3B depicts the cassette of FIG. 3A with a strip of unprepared membrane overlying the membrane-holding frames.

FIG. 3A depicts cassette 330, which has a plurality of membrane-holding frames 224 that are linked to one another by holding bridge 332. As suits the requirements of a given application, unprepared membrane (e.g., not yet sized, etc.) 223 is positioned over the plurality of membrane-holding frames 224, as depicted in FIG. 3B. The membrane is then attached to each of membrane-holding frames 224 by fasteners 228 (not depicted in FIG. 3B). In some other variations of the illustrative embodiment, prefabricated (e.g., sized, etc.) segments of membrane are positioned and attached to each of membrane-holding frames 224.

Figure 3C:
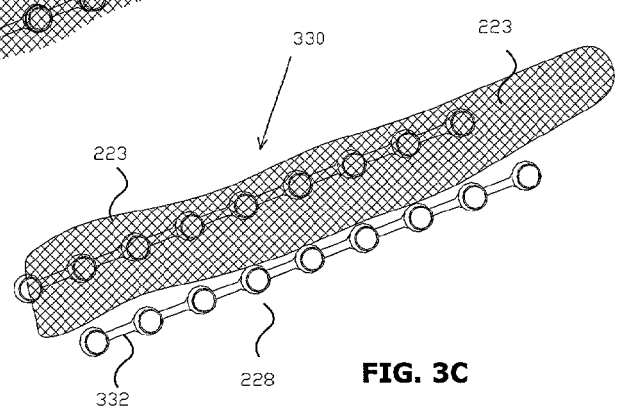
FIG. 3C depicts the cassette of FIG. 3A wherein a plurality of linked fasteners are positioned to secure the membrane to cassette.

In yet some further variations, membrane is simultaneously attached to each of the membrane-holding frames 224 in cassette 330. This is depicted, via an exploded view, in FIG. 3C, wherein after unprepared membrane is positioned over membrane-holding frames 224, a plurality of fasteners 228, which are linked together by holding bridge 332, secure the membrane to cassette 330.

The membrane-holding frames can be separated during installation into multi-chamber enclosure 100, as described later in this specification. Cassette 330 thereby facilitates rapid preparation of a plurality of membranes 222 and rapid attachment of the membranes to membrane-holding frames 224. And this rapidity, in turn, aids in the preservation of biological activity of membrane 222. Those skilled in the art of high-speed assembly will appreciate that this method of placing and fixing a relatively softer material (i.e., membrane 222) onto a rigid frame (i.e., membrane-holding frame 224) is indicative of a process that can be readily automated.

As desired, after membrane 222 has been mounted onto a single membrane holding frame 224 or cassette 330, it can be prepackaged in preservation solutions under appropriate conditions for future insertion into multi-chamber enclosure 100.

Figure 4:
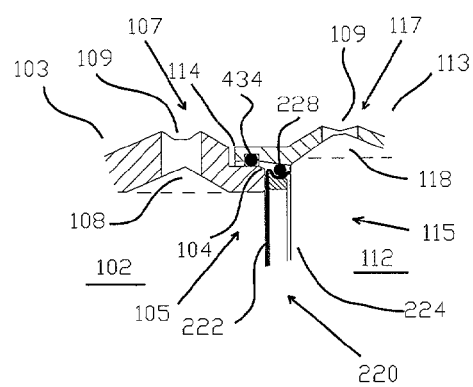
FIG. 4 depicts an enlargement of the chamber-chamber interface of the dual-chamber, multi-chamber enclosure of FIG. 1.

FIG. 4 depicts an enlarged view of the interface between chamber 102, chamber 112 and membrane-holding assembly 220. As depicted in FIG. 4, large aperture 105 of housing 103 is slightly smaller than large aperture 115 of housing 113. Specifically, the inner diameter of marginal region 114 of housing 113 is sized to receive the outer diameter of marginal region 104 of housing 103. Chambers 102 and 112 can then be isolated from one another by a fluid-tight seal that is created via fastener 228 and chamber seal 434 (e.g., O-ring, etc.) in conjunction with membrane 222. In particular, membrane-holding frame 224 (and membrane 222) is sealed by fastener 228 against inner diameter of marginal region 114 (of housing 113). And, also, chamber seal 434 seals the outer diameter of marginal region 104 (of housing 103) against the inner diameter of marginal region 114.

With continued reference to FIG. 4, and with reference to FIG. 1, the diameter of each member increases moving from marginal region 104 to region 107 (on housing 103), and from marginal region 114 to region 117 (on housing 113). This increase in diameter in each member provides a region within each chamber that has a relatively expanded volume. This configuration enables membrane 222 to be fully submerged while maintaining a small, liquid-free region 108 in chamber 102 and a small, liquid-free region 118 in chamber 112. Vent 109 is advantageously located in the "uppermost" location within regions 108 and 118, thereby enabling free exchange of fluids out of chamber 102 and chamber 112, as appropriate.

Figure 5:
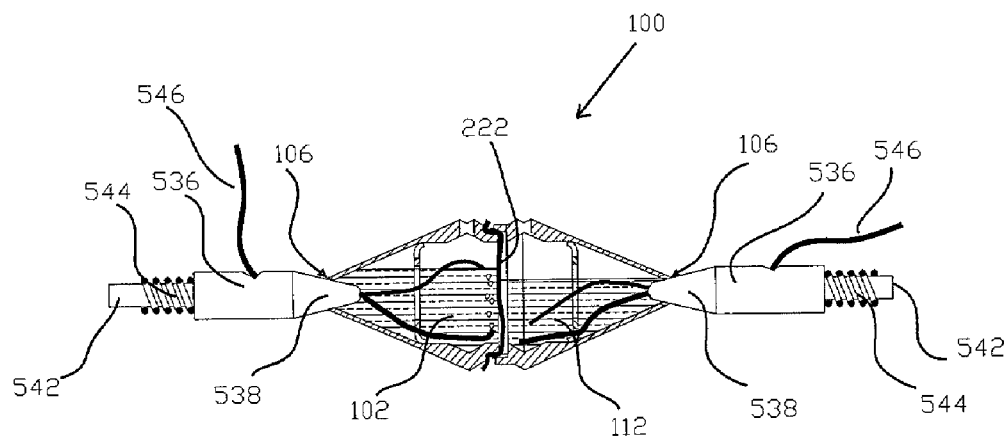
FIG. 5 depicts an assembled, cross-sectional view of the dual-chamber, multi-chamber enclosure of FIG. 1 including feed fittings and conduits containing tubes for delivering fluid to and receiving fluid from individual chambers of the multi-chamber enclosure.

FIG. 5 depicts a cross-sectional side view of multi-chamber enclosure 100 of FIG. 1 in an assembled state. As depicted in FIG. 5, each small aperture 106 receives tapered region 538 of feed fittings 536, and is suitably sized for this purpose. A spring-biasing element advantageously mechanically couples to each feed fitting 536. In the illustrative embodiment, the spring-biasing element is holding spring 544; however, other arrangements capable of providing a force that is directed toward multi-chamber enclosure 100, as are known to those skilled in the art, can suitably be used. This force maintains the mechanical integrity and fluidic seals between all interfaces throughout multi-chamber enclosure 100. Holding spring 544 is received by spring-holding extension 542.

Feed fittings 536 hermetically accommodate conduits 546. A seal (not depicted) prevents leakage of any fluid in the space between conduit 546 and a hole (not depicted) in feed fitting 536 that receives conduit 546. Conduits 546, in conjunction with a fluidic-control system described later in this specification, introduce liquid and gases into chamber 102 and 112, as desired, and also retrieve liquids and gases from these chambers. In the variation depicted in FIG. 5, chamber 102 serves as a feed chamber, which receives a compound. Chamber 112 is a receiving chamber that receives however much of the compound that passes from chamber 102 through membrane 222 and into chamber 112.

Figure 6:
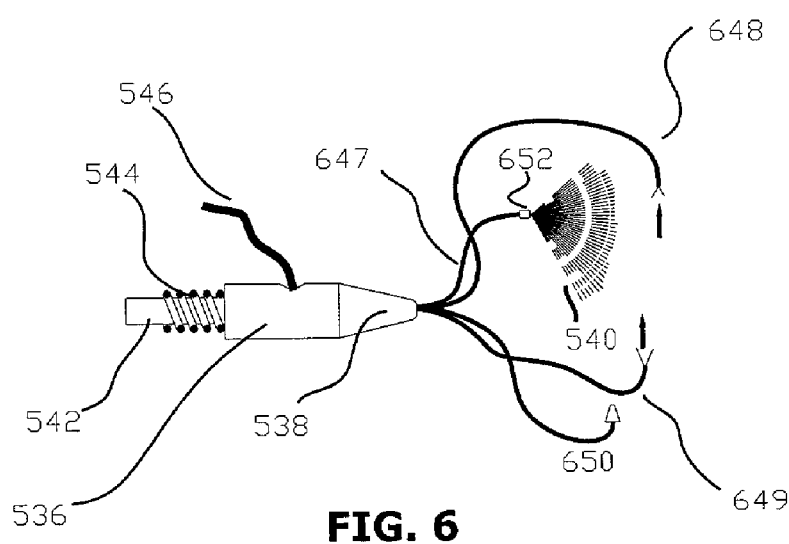
FIG. 6 depicts a feed fitting and conduit containing a plurality of tubes.

With continuing reference to FIG. 5, and with reference to FIG. 6, conduit 546 advantageously carries a plurality of tubes, such as tubes 647-650, which are shown emerging from tapered region 538 of feed fitting 536. An opening (not depicted) is located at the end of tapered region 538 for this purpose. Although four tubes are depicted in FIG. 6, it will understood that in other variations of the illustrative embodiment, more than four tubes or fewer than four tubes, as suits a particular application, are suitably contained in each conduit 546.

In some variations of the illustrative embodiment of the present invention, each tube (e.g., tubes 647-650, etc.) performs a different function. For example, in the variation depicted in FIG. 6, tube 648 removes fluid from a chamber, tube 649 introduces fluid into a chamber; and tube 647, which is terminated with nebulizing nozzle 652, produces an aerosol or other spray pattern. Various methods of generating spray patterns using, for example, nebulizing nozzles, are well known in the art. In one method, specially-shaped nozzles spray pressure-fed liquids. In another method, a pressurized gas is used in conjunction with an adjacent liquid-supplying nozzle. Miniature spray nozzles, which are typically made from metal, glass, ceramic and other materials, are commercially available from Microglass Co. of Keene, Tex., Misty Mate Inc. of Gilbert, Ariz., and others.

In some variations of the illustrative embodiment, it is advantageous to position the various tubes (e.g., tubes 647-650) in different locations and/or in different orientations within a chamber (e.g., chambers 102 and 112). The position and orientation of the tube will, in some cases, be dictated by the desired function of the tube. Some of the functions that are provided by the tubes include, without limitation:

Filling individual chambers with selected solvents at selected rates while maintaining the desired position of the tube.

Evacuating any amount of fluid from either or both of the individual chambers 102 and 112.

Injecting gas or gas mixtures as might be required to sustain a proper environment (e.g., an oxygen/carbon dioxide mixture), to remove stagnant layers, to agitate, etc.

Generating an aerosol-type spray to evenly coat membrane 222.

Consequently, as might be required for some variations of the illustrative embodiment, it is advantageous to provide a device for fixing each tube in a desired location and orientation within the chamber.

Figure 7:
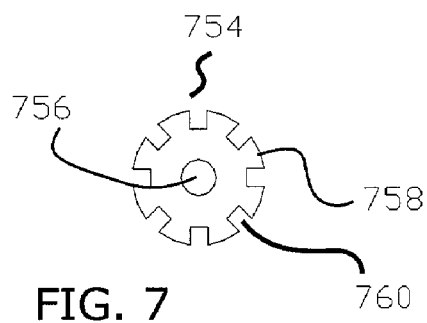
FIG. 7 depicts a guide for supporting and positioning tubes with a chamber.

One device suitable for accomplishing this function is guide 754, which is depicted in FIG. 7. In use, guide 754 is disposed within chamber 102 and/or 112 (see, e.g., FIG. 8; also depicted in FIGS. 1, 5 without identification). Guide 754 has central opening 756, and has a castellated perimeter that is defined by spaced tabs 758. Central opening 756 and slots 760 between adjacent tabs 758 can be used to position a tube in a desired location and orientation within chambers 102 and 112. Tabs 758 of guide 754 engage the inside surface of the wall that defines the chambers 102 or 112, thereby fixing guide 754 in place.

A second device for positioning and orienting individual tubes (e.g., tubes 647-650) is a "shape memory" insert (not depicted). This type of insert can be formed from a soft metal (e.g. copper, lead, etc.) that is coated by an inert material (e.g., teflon, polypropylene, etc.) or that is sealed inside soft (e.g., Teflon™, etc.) tubing and attached to one or more locations along the exterior surface of the tubes.

Figure 8:
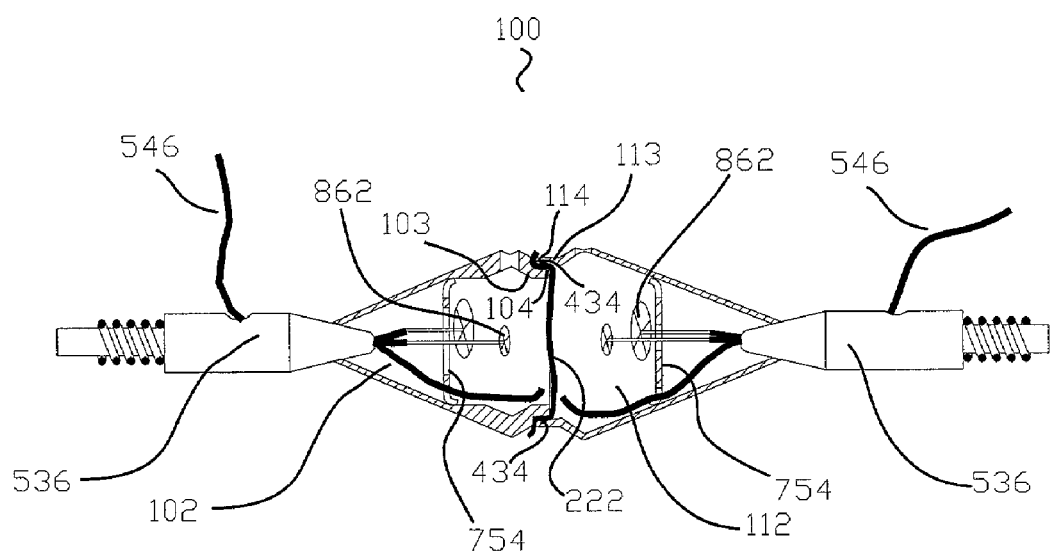
FIG. 8 depicts a dual-chamber, multi-chamber enclosure having electrodes, and a directly-mounted (no frame) membrane, in accordance with a variation of the illustrative embodiment of the present invention.

FIG. 8 depicts a further variation of the illustrative multi-chamber enclosure. In multi-chamber depicted in FIG. 8 (which is again a dual-chamber arrangement), membrane 222 is not fitted to a membrane-holding frame (e.g., membrane-holding frame 224). Rather, membrane 222 is mounted directly between chambers 102 and 112. This can be done, for example, by positioning membrane 222 so that it overlaps the outer diameter of marginal region 104 of conical-shaped housing 103. As marginal region 114 (of conical-shape housing 113) receives marginal region 104 (of conical-shaped member 102) to join housings 103 and 113, chamber seal 434, which is disposed against the inner diameter of marginal region 114, presses against membrane 222, thereby creating a seal.

In the variation depicted in FIG. 8, a multi-chamber enclosure in accordance with the illustrative embodiment includes electrodes 862. Electrodes 862 supply and/or measure electrical potential and the resulting current across said membrane 222, thereby providing a capability to investigate electrical characteristics of membrane transport.

Electrodes 862 are hermetically introduced into individual chambers 102 and 112, as desired, through feed fittings 536. Electrodes 862 are electrically insulated from all other parts of the multi-chamber enclosure. Electrodes 862 can be, for example, platinum wire that is shaped (e.g., manually) into a desired configuration for generating or measuring an electrical field. In one such configuration that is depicted in FIG. 8, electrodes 862 have an "umbrella" configuration. The umbrella configuration is desirable for distributing an electrical field across the entire surface of membrane 222. Distributing the electrical field across the entire surface of membrane 222 aids in obtaining results that are independent of local fluctuations in conditions along the membrane.

In the variations of a multi-chamber enclosure 100 that are depicted in FIGS. 1, 5 and 8, the multi-chamber enclosure has two chambers 102 and 112 (i.e., it is a "dual-chamber multi-chamber enclosure"). It will be understood that in some other variations of the illustrative embodiment, more chambers are present.

Figure 9:
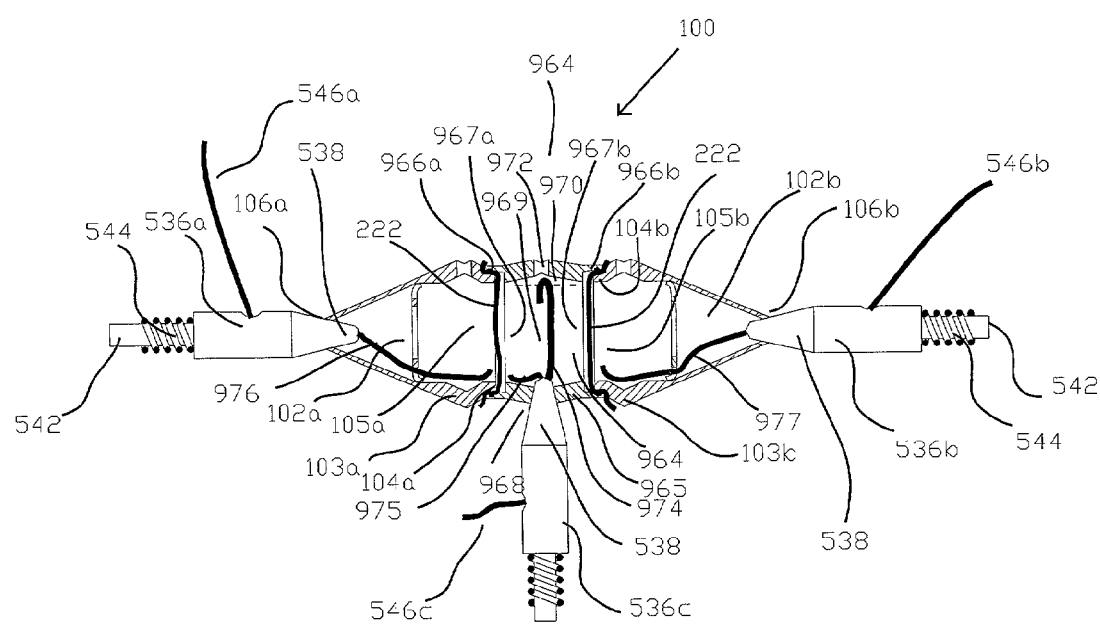
FIG. 9 depicts a triple-chamber, multi-chamber enclosure that uses two membranes, in accordance with a variation of the illustrative embodiment of the present invention.

For example, FIG. 9 depicts a tri-chamber multi-chamber enclosure in accordance with a variation of the illustrative embodiment. The multi-chamber enclosure depicted in FIG. 9 has two conical-shape housings 103a and 103b that flank cylindrical-shape housing 965.

Conical-shape housings 103a and 103b are configured like conical-shape housing 103 that is depicted in FIGS. 1, 5 and 8. In the tri-chamber multi-chamber enclosure depicted in FIG. 9, two membranes 222 are used to form and seal the chambers. Like the variation of the illustrative embodiment that is depicted in FIG. 8, membranes 222 are mounted, without a membrane-holding frame, at each conical-shape housing/cylindrical-shape housing interface.

In conjunction with one of the membranes 222, conical-shape housing 103a defines chamber 102a. In conjunction with the other of membranes 222, conical-shape chamber 103b defines chamber 102b. In conjunction with both of the membranes 222, cylindrical-shape housing 965 defines chamber 964. Thus, one of the membranes 222 isolates chamber 102a from chamber 964, and the other of the two membranes 222 isolates chamber 102b from chamber 964.

In some variations, chamber 964 functions as a feed chamber to introduce fluids into the tri-chamber multi-chamber enclosure, and chambers 102a and 102b are receiving chambers that receive compounds that cross membranes 222.

Cylindrical-shape housing 965 has two large apertures 967a and 967b that are formed at respective marginal regions 966a and 966b. Large aperture 967a of cylindrical-shape housing 965 is slightly larger than large aperture 105a of conical-shape housing 103a. Similarly, large aperture 967b of cylindrical-shape housing 965 is slightly larger than large aperture 105b of conical-shape housing 103b. More particularly, the inner diameter of marginal region 966a (of cylindrical-shape housing 965) has a size that is appropriate for receiving the outer diameter of marginal region 104a (of housing 103a). And, likewise, the inner diameter of marginal region 966b (of cylindrical-shape housing 965) has a size that is appropriate for receiving the outer diameter of marginal region 104b (of housing 103b).

As in the variations of multi-chamber enclosure 100 that depicted in FIGS. 1, 5 and 8, conical-shape housings 103a and 103b have respective small apertures 106a and 106b. Apertures 106a and 106b accommodate tapered region 538 of respective feed fittings 536a and 536b. Cylindrical-shape housing 965 includes small aperture 968 that is oriented along an axis that is orthogonal to the axis that aligns with small apertures 106a and 106b. Small aperture 968 accommodates tapered region 538 of feed fitting 536c. Each of the three feed fittings 536a through 536c receives respective conduits 546a, 546b and 546c. As described in conjunction with previous variations of the illustrative embodiment, the conduits 546a through 546c advantageously each carry a plurality of tubes. In FIG. 9, conduit 546c delivers tubes 974 and 975 to chamber 964. Tube 974 is for aspirating (removing) fluid from chamber 964, and tube 975 is for delivering fluid to chamber 964. Conduit 546a delivers tube 976 to chamber 102a and conduit 546b delivers tube 977 to chamber 102b. Tubes 976 and 977 are for aspirating fluid from chambers 102a and 102b, respectively.

The diameter of cylindrical-shape housing 965 increases to a maximum at region 969 near the mid-point between the two large apertures 967a and 967b. This increase in diameter provides a region having a relatively expanded volume. As previously described in conjunction with other variations of the illustrative embodiment, this configuration enables membranes 222 to be fully submerged while maintaining a small, liquid-free region 970 in chamber 964. Vent 972 is advantageously located in the "uppermost" location within region 970 to enable free exchange of fluids out of chamber 964, as appropriate.

Figure 10:
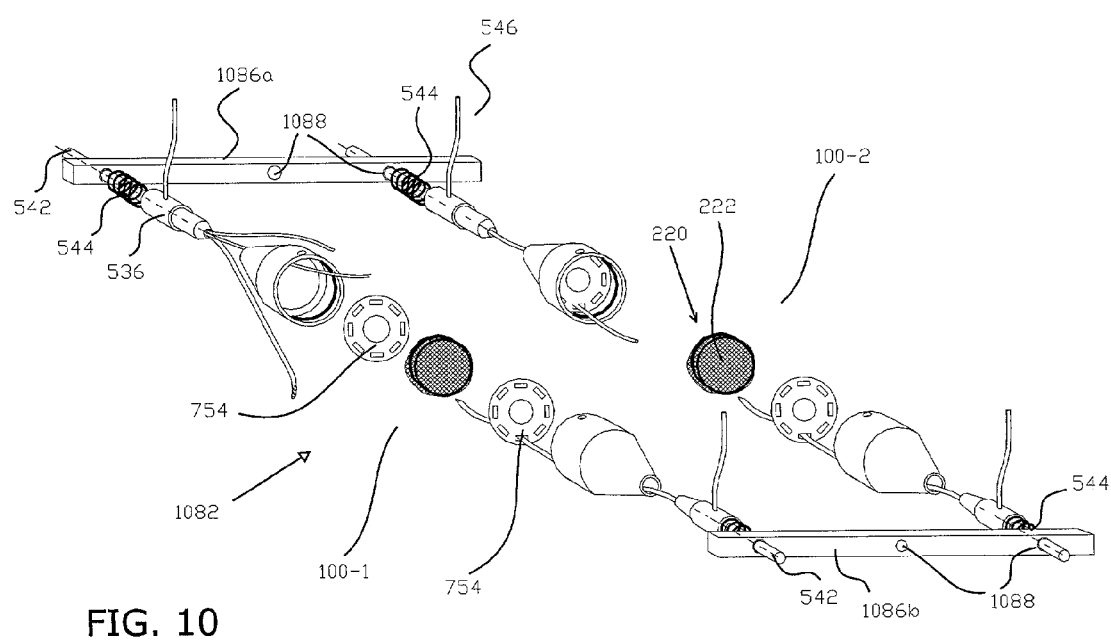
FIG. 10 depicts an array of multi-chamber enclosures within a frame.

FIG. 10 depicts, via an exploded view, an array 1082 of multi-chamber enclosures 100-j, where j=1, n, where n is an integer. The multi-chamber enclosures depicted in array 1082 are the dual-chamber multi-chamber enclosure depicted in FIGS. 1, 5 and 8. For clarity, only two multi-chamber enclosures 100-1 and 100-2 of the array 1082 are depicted in FIG. 10. It will be understood that array 1082 can comprise any desired number, n, of multi-chamber enclosures 100. General rules of the biochemical industry usually dictate, however, that this number, n, should be a multiple of eight or twelve for ease of interfacing with multi-well plates. Furthermore, it is understood that in other variations of the illustrative embodiment, array 1082 consists of other variations of multi-chamber enclosure 100. In still further embodiments, different variations of multi-chamber enclosure 100 are included within a single array.

The variations of multi-chamber enclosure 100 in accordance with the illustrative embodiment of the present invention that have been described herein and depicted in the accompanying drawings (e.g., FIGS. 5 and 8) show small apertures 106 (of housings 103 and 113) receiving spring-biased feed-fittings 536. This arrangement is particularly advantageous. Specifically, in addition to providing a way to introduce tubes into the multi-chamber enclosure, and in addition to any other benefits, this arrangement provides a way to easily:

seal the multi-chamber enclosure; and
install the multi-chamber enclosure into a surrounding structure.

These points are illustrated in FIG. 10. In FIG. 10, multi-chamber enclosures 100-1 and 100-2 are depicted in "exploded" fashion, showing feed fittings 536, the conical-shape housings, guides 754, membrane-holding assembly 220, and membrane 222. Conduits 546, which are received by feed fittings 536, deliver tubes to the multi-chamber enclosures.

As depicted in FIG. 10, each multi-chamber enclosure 100-j is mounted to two spaced-apart rails 1086a and 1086b. The rails compose frame 1184 (see FIG. 11). Rails 1086a and 1086b each include a plurality of openings 1088. Openings 1088 receive a spring-holding extension 542 that depends from each feed fitting 536. Spring-holding extensions 542 accommodate a spring-biasing element, such as holding springs 544, which are referenced against rails 1086a and 1086b and exert a force that is directed towards multi-chamber enclosures 100-j. It is seen that for each multi-chamber enclosure 100-j, the spring-biasing elements (e.g., springs 544, etc.), feed fittings 536, small apertures 106 are all aligned with an axis passing through spring-holding extensions 542 (see, e.g., FIG. 5). This arrangement assures the mechanical integrity and hermetic seal of each multi-chamber enclosure 100-*j*. Also, the use of holding springs 544 enables the installation of fully assembled individual multi-chamber enclosures 100 in frame 1184 (see, e.g., FIG. 11).

Furthermore, this arrangement (i.e., frame 1184, holding springs 544, feed fittings 536, the enclosure halves, etc.) is advantageously used in conjunction with cassette 330 (see FIGS. 3A through 3C) to rapidly install membranes 222 into each multi-chamber enclosure 100-*j*. In particular, each membrane-holding frame 224, with membrane 222 attached, is sandwiched between the housings. Once multi-chamber enclosures 100-*j* are sealed via the force applied by holding springs 544, holding bridge 332 that is disposed between adjacent membranes 222 is severed, as desired.

For a tri-chamber multi-chamber such as is depicted in FIG. 9, a third rail (not depicted) is advantageously provided in frame 1184. The third rail is configured in the manner of rails 1086*a* and 1086*b* to provide openings that receive spring-holding extension 542 that depends from each feed fitting 536. Each spring-holding extension 542 accommodates a spring-biasing element that is referenced against the third rail so that feed fitting 546*c* (see, FIG. 9) is forced into small aperture 968.

Figure 11:
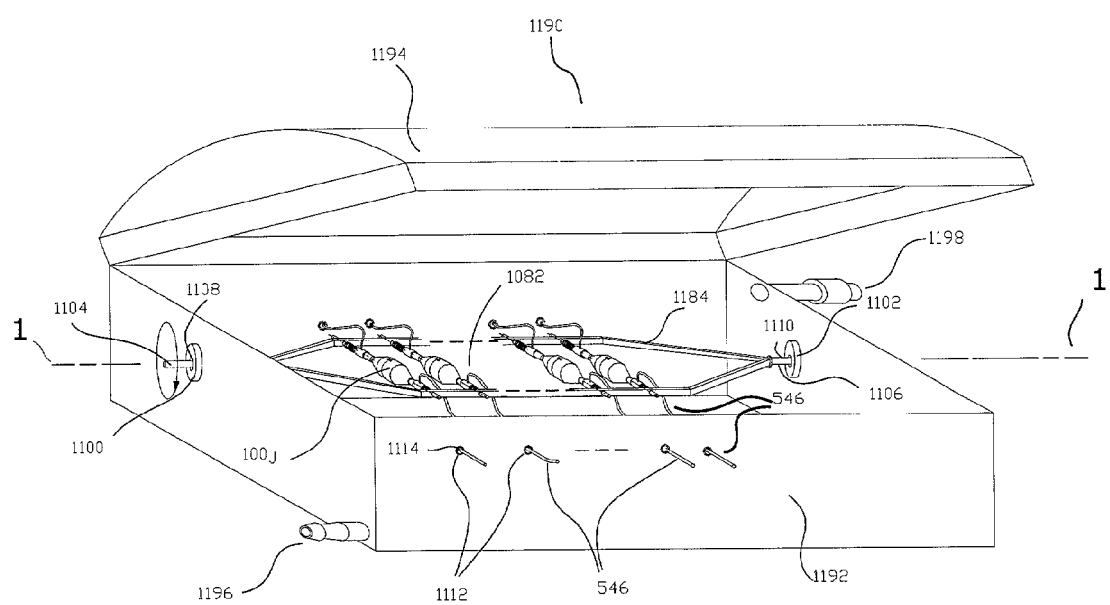
FIG. 11 depicts a mother chamber containing a plurality of multi-chamber enclosures.

FIG. 11 depicts array 1082 of multi-chamber enclosures 100-*j* (four are shown) retained by frame 1184 and located inside mother chamber 1190. The mother chamber provides one or more of the following benefits, among any others:

protects the multi-chamber enclosures;

provides a fully-controllable environment for the multi-chamber enclosures; and orients and rotates said chamber assemblies allowing for the preferred distribution of substances within said chamber assemblies.

Mother chamber 1190 includes base 1192 and cover 1194. Base 1192 of mother chamber 1190 includes fittings 1196 and 1198. These fittings function, in some variations, as a liquid inlet (typically fitting 1196) and liquid outlet (typically 1198) to enable a temperature-controlled liquid to be circulated through base 1192. In this way, mother chamber 1190 provides thermal control of submerged array 1082 of multi-chamber enclosures 100-*j*.

In the variation depicted in FIG. 11, frame 1184 is received by base 1192 through two openings 1100 and 1102. More particularly, support members 1104 and 1106 that depend from frame 1184 are received by openings 1100 and 1102. Seals 1108 and 1110 are provided to prevent leakage of liquid (e.g., temperature-controlled liquid, etc.) from base 1192 through openings 1100 and 1102.

It is advantageous to have a capability to rotate array 1082 of multi-chamber enclosures 100-*j* within mother chamber 1190. For example, in conjunction with some studies, it might be necessary to place multi-chamber enclosures 100-*j* in a vertical orientation (i.e., orthogonal to the orientation depicted in FIG. 11), or subject multi-chamber enclosures 100-*j* to a "centrifugal" force.

To this end, frame 1184 and openings 1100 and 1102 are physically adapted to enable frame 1184 and the captive multi-chamber enclosures 100-*j* to rotate about axis 1-1. For example, in such variations, support members 1104 and 1106 advantageously have a cylindrical shape and a smooth surface. Additionally, openings 1100 and 1102 can be fitted with nylon grommets, bearings, etc., to promote free rotation. A device, such as a stepper motor (not shown) for rotating frame 1184, is advantageously provided. Typically, the stepper motor, etc., is mechanically coupled to one of support members 1104 and 1106 to rotate frame 1184.

In the variation depicted in FIG. 11, openings 1112 receive conduits 546 which, as previously described, provide for exchange of fluids between multi-chamber enclosures 100-*j* and the fluidic control system, described below. Seals 1114 prevents liquid from leaking out of base 1192 through openings 1112.

Conduits 546 enter mother chamber 1190 from a direction that is orthogonal to the axis of rotation 1-1, as depicted in FIG. 11. Consequently, the rotation of the multi-chamber enclosures 100-*j* is limited, practically, to less than a full rotation. (That is, the rotation of frame 1184 would require a substantial amount of slack and excess conduit 546 that would wrap around frame 1184 as the frame rotates.) For most applications, this limited amount of rotation will not be a problem. If, however, a capability for farther rotation is desired, a single opening (not shown) that receives all conduits 546 is advantageously provided at a location that is very close to opening 1100 or 1102. Since, in this variation, conduits 546 are aligned with axis of rotation 1-1, some multiple number of rotations of the frame 1184 can be tolerated without requiring a large excess of slack conduit 546.

Figure 12:
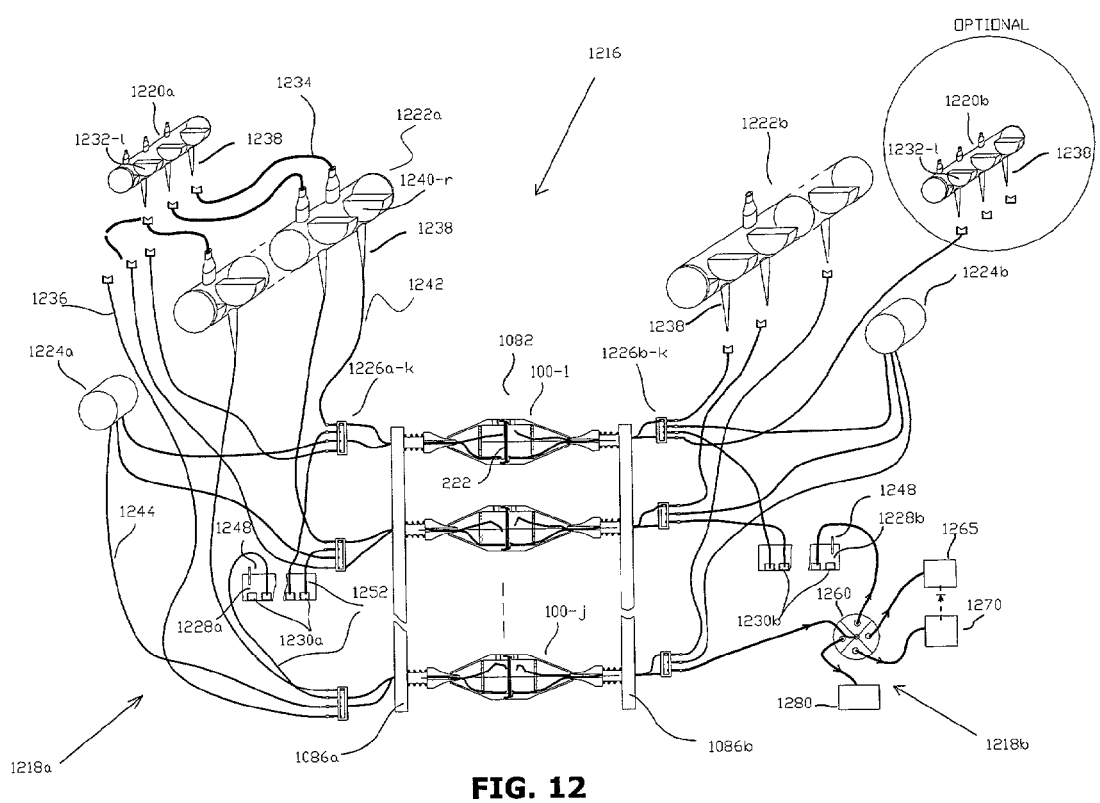
FIG. 12 depicts a fluid control system for use in conjunction with a multi-chamber enclosure.

FIG. 12 depicts an embodiment of fluidic control system 1216 for delivering fluid to and receiving fluid from multi-chamber enclosures 100-*j* (three are shown), and for interfacing with sampling devices and other types of instrumentation. Fluidic control system 1216 places all multi-chamber enclosures 100-*j* in array 1082 in fluid communication with all liquid and gas sources and receivers that are required for conducting required tests. It will be appreciated that the functionality, as described below, provided by the specific embodiment of fluidic control system 1216 that is depicted in FIG. 12 can be provided by many different arrangements, as can be devised by those skilled in the art in view of the present teachings. For example, precise dosing equipment, well-known in the art, can be used instead of some of reservoirs and fluid switches that compose system 1216 shown in FIG. 12. Consequently, fluidic control system 1216 that is depicted in FIG. 12 is presented by way of illustration, not limitation.

With reference to FIG. 12, fluidic control system 1216 is divided into supply-side system 1218*a* and receiving-side system 1218*b*. This division is based on the designation of one of the chambers in the multi-chamber enclosure as a "supply" chamber and the other chamber as a "receiving" chamber. These designations refer to the direction of movement, across membrane 222, of a compound that is under investigation.

In FIG. 12, supply-side system 1218*a* includes elements that appear to the "left" of multi-chamber enclosures 100-*j* and receiving-side system 1218*b* includes elements that appear to the "right" of multi-chamber enclosures 100-*j*. It should be understood that the arrangement shown (i.e., supply on the "left" and receiving on the "right") is arbitrary (although it is tied to the designation of the chambers within the multi-chamber enclosure as "supply" or "receiving"). The specific location in FIG. 12 in which the individual elements composing supply-side system 1218*a* and receiving-side system 1218*b* appear is more for the sake of clarity than any design considerations. It will be understood that one or more elements of supply-side system 1218*a* and receiving-side system 1218*b* can be co-located, as desired.

With continued reference to FIG. 12, supply-side system 1218*a* includes supply-side compound reservoir 1220*a*, supply-side buffer-solution reservoir 1222*a*, supply-side gas reservoir 1224a, supply-side fluid switches 1226a-k (where k=1, p, where p is an integer), supply-side vacuum chamber 1228a, and supply-side sample receivers 1230a, interrelated as shown.

Supply-side compound reservoir 1220a advantageously, but not necessarily, includes a plurality of partially isolated compartments 1232-l, where l=1, q, and where q is an integer. These partially isolated compartments enable q different liquids to be fed to different multi-chamber enclosures 100-j in array 1082. For this reason, it is advantageous but not necessary for the number of compartments, q, to be equal to the number, n, of multi-chamber enclosures 100-j. If it is desirable to feed the same liquid to each multi-chamber enclosure 100-j, then liquid can simply overflow the barriers that segregate compartments 1232-l.

Supply-side compound reservoir 1220a either feeds supply-side buffer-solution reservoir 1222 or is directly connected to supply-side fluid switches 1226a-k. To this end, tubing 1234 that leads to supply-side buffer solution reservoir 1222a, and tubing 1236 that leads to supply-side fluid switches 1226a-k, are advantageously, but not necessarily, provided with disconnect fittings 1238.

Supply-side buffer-solution reservoir 1222a includes a plurality of isolated compartments 1240-r, where r=1, s, and where s is an integer. Advantageously although not necessarily, the number, s, of compartments 1240-r in supply-side buffer-solution reservoir 1222a is equal to the number, q, of compartments 1232-l in supply-side compound reservoir 1220a. And, as previously noted, it is advantageous but not necessary for the number of compartments, q, to be equal to the number, n, of multi-chamber enclosures 100-j.

Liquid is delivered through tubing 1242 from supply-side buffer-solution reservoir 1222a to supply-side fluid switches 1226a-k. Liquid is fed to supply-side fluid switches 1226a-k, from either supply-side compound reservoir 1220a or supply-side buffer-solution reservoir 1222a, by either pressure or gravity feed.

Supply-side gas reservoir 1224a supplies gas (or gas mixtures) to supply-side fluid switches 1226a-k via tubing 1244.

Thus, all supply-side fluid (i.e., gas and liquid) is fed to supply-side fluid switches 1226a-k. The fluid switches provide proper logic, volume and timing of the exchange of all liquid and gas between multi-chamber enclosures 100-j and rest of fluid control system 1216. In the illustrative embodiment, there is one supply-side fluid switch 1226a-k per multi-chamber enclosure 100-j. Consequently, the number, p, of supply-side fluid switches 1226a is advantageously, but not necessarily, equal to the number, n, of multi-chamber enclosures 100-j. In some other variations, a single fluid switch handles fluid exchange for more than one multi-chamber enclosure 100, such that p<n. Switches suitable for this service include, among others, multi-position valves from Valco Instruments Company of Houston, Tex.

Fluids are sampled from the "supply" chamber of multi-chamber enclosures 100-j by, for example, gravity or negative pressure. In the illustrative embodiment, supply-side vacuum chamber 1228a having vacuum pull 1248 provides a negative pressure to aspirate fluid from the supply chamber of each the multi-chamber enclosures 100-j. Receivers 1230a are disposed within supply-side vacuum chamber 1228a. Receivers 1230a, are, in various embodiments, wells of a multi-well plate, vials, bottles, slides, substrate, "biochips," etc., as appropriate. Tubing 1252 delivers aspirated fluid from supply-side fluid switches 1226a-k to supply-side vacuum chamber 1228a. Sample analysis is described below in conjunction with the description of receiving-side system 1218b.

With continued reference to FIG. 12, receiving-side system 1218b includes the same reservoirs and switches as supply-side system 1218a, although not all tubing is shown (e.g. tubing 1234 connecting compound reservoir 1220b to buffer-solution reservoir 1222b, etc) for the sake of clarity. In particular, receiving-side system 1218b includes receiving-side compound reservoir 1220b, receiving-side buffer-solution reservoir 1222b, receiving-side gas reservoir 1224b, receiving-side fluid switches 1226b-k (where k=1, p, where p is an integer), receiving-side vacuum chamber 1228b, and receiving-side sample-receivers 1230b, interrelated as shown.

Receiving-side system 1218b functions in the same manner as supply-side system 1218a to deliver or receive fluids from receiving side chambers of each multi-chamber enclosure 100-j in the array 1082.

Also shown on receiving-side 1218b are illustrative connections to analytical devices. For clarity, these connections are depicted only for the receiving chamber of the "$n^{th}$" multi-chamber enclosure (i.e., 100-n). It should be understood that all chambers (i.e., both feed chambers and receiving chambers) are advantageously, although not necessarily, connected to analytical instrumentation.

With continuing reference to FIG. 12, tubing connects the "$n^{th}$" receiving-side fluid switch 1226b-k to distribution valve 1260. The distribution valve can be, for example, a multi-position valve such as is available from Valco Instruments Company, Houston, Tex. Distribution valve 1260 is in line with one of the positions of the receiving-side fluid switch. Consequently, through the action of the receiving-side fluid switch, a sample is selectively sent to distribution valve 1260.

Distribution valve 1260 is connected to various analytical devices. In the illustrative embodiment, distribution valve 1260 is connected to (1) receivers 1230b; (2) mass spectrometer 1265; (3) high precision liquid chromatograph ("HPLC") 1270; and (4) other analytical devices 1280, such as, without limitation, capillary electrophoresis and a fraction collector. Additionally, liquid chromatograph 1270 and mass spectrometer 1265 can be connected for tandem analysis in known fashion. In operation, distribution valve 1260 is selectively addressed to the desired analytical device.

Sampling from the feed or receiving chamber(s) in multi-chamber enclosures 100-j can be performed in a continuous manner to provide information concerning process kinetics. Distribution of a sample can be performed sequentially, such as by using the arrangement depicted in FIG. 12, or in parallel, using parallel sets of lines and valves. Those skilled in the art will know how to use one or more multi-position valves 1260 to parallel comparative analyses.

In summary, multi-chamber enclosure 100 and fluidic-control system 1216 in accordance with the illustrative embodiment of the present invention provide, collectively, a system that is useful, among other functions, for investigating compound absorption (i.e., compound-membrane interactions). Some variations of this system provide a capability of investigating compound-membrane interactions under programmable and controlled-variable sequences, timing, rate/intensities and chemical/physical conditions, including, without limitation:

| | |
|---|---|
| Range of pH | Temperature of fluids, gases and environment |
| Range of compound concentrations | Mixture of gases for perfusion |
| Rate of perfusion | Sequence of fluid/compound exchange |
| Rate of fluid/compound exchange | Rate of purging of compounds and mixtures |
| Rate of aeration | Rate of spraying of tissue with compounds or mixtures |
| Rate of washing of tissue | |

Illustrative compound-membrane interactions, and a method for studying them using the illustrative system, are described below.

Studies of compound absorption are advantageously conducted in the dual-chamber variation of multi-chamber enclosure 100. Epithelial tissue, for example, prepared as previously described, is used as membrane 222 and is mounted between chamber 102 and chamber 112 (see, e.g., FIGS. 1, 5 and 8). The mucosal side of the tissue, for example intestinal tissue, faces the "supply" chamber of multi-chamber enclosure 100. (As previously indicated, either chamber in a dual-chamber multi-chamber enclosure can be designated as the supply chamber. For the purposes of the present discussion, chamber 102 is designated as the supply chamber and chamber 112 is designated as the receiving chamber.) When the mucosal side faces the supply chamber 102, the flux of the compound being studied propagates from the mucosal side of membrane 222 to the serosal side of membrane 222. This direction of compound flux is the same as occurs in vivo, wherein the transported compound moves through the brush border membrane and baso-lateral membrane of the cells of the intestinal mucosa before reaching the underlying capillaries of the submucosa. The same tissue orientation is valid for other epithelial tissues such as, for example, buccal, nasal, corneal, pulmonary or vaginal. In the case of dermal tissue, however, the epidermis faces the supply chamber 102.

To study compound absorption, the compound under investigation is provided in a buffer solution and is delivered, from supply-side compound reservoir 1220a, to supply chamber 102 via supply-side fluid switch 1226a. Alternatively, the compound, in pure form, can be directed to supply-side buffer-solution reservoir 1222a and then delivered, via supply-side fluid switch 1226a, into supply chamber 102. Simultaneously, receiving chamber 112 is filled with the same buffer solution, without the compound. This arrangement is used to study compound flux from supply chamber 102 into receiving chamber 112.

The pH of buffer solutions that are delivered to supply chamber 102 and/or chamber 112 can be changed. This facilitates the investigation of compound absorption at conditions that correspond to the pH prevailing in different regions of the gastro-intestinal system (ie., ranging from a pH 1.5 in the stomach to a pH 7.5 in the intestine).

The supply of solutions with controlled pH is provided through one of the tubes within conduit 546 (e.g., see FIGS. 5 and 6: tubes 647-650). Another of the tubes supplies a gas mixture (usually oxygen and carbon dioxide at a volumetric ratio of 95:5), which is necessary for tissue oxygenation and mixing the buffer solutions.

In some other variations of a method in accordance with the illustrative embodiment, the compound under investigation is introduced only into receiving chamber 112 for a back-flux study into supply chamber 102.

Mother chamber 1190 (see FIG. 11) maintains constant temperature, which is usually in the range of body temperature, during experimentation. Incubation time, which depends on the nature of compound under investigation, its transport mechanism, binding, metabolic, and other characteristics, should be optimized experimentally for each compound in known fashion.

At the end of incubation and/or during the incubation cycle, samples of the buffer/compound solution are taken from receiving chamber 112 (and feed chamber 102, if desired), through a tube that is aspirating. The samples are then analyzed using known analytical methods. An increase in compound concentration in receiving chamber 112 characterizes the compound's absorption or trans-membrane transport. This method can be used for absorption screening of different types of compounds (e.g., drugs, nutrients, nutraceuticals, cosmetics, cosmeceuticals, or other xenobiotics, etc.) that might use different mechanisms for their transport through live tissues.

To evaluate compound accumulation in tissue, membrane 222 is removed from multi-chamber enclosure 100, rinsed with buffer solution, and homogenized in an appropriate solution or dissolved in 1 M sodium hydroxide. The compound is then further extracted and tested using appropriate analytical methods in known fashion. After completion of each individual study, multi-chamber enclosures 100 are taken apart, washed and, if necessary, sterilized following standard GLP requirements. When testing lipophilic compounds, a wash with 10 percent or 50 percent soap solution (e.g., Ivory® brand liquid soap, Proctor and Gamble Co., etc.) is recommended. In some variations of the illustrative embodiment, disposable multi-chamber enclosures are used to simplify and accelerate testing processes.

As indicated earlier, illustrative multi-chamber enclosure 100 and methods in accordance with the present invention, as described herein, can be used to study compound absorption in different types of tissues. In cosmetology and dermatology, for example, multi-chamber enclosure 100 can be used to conduct single and/or multiple compound applications onto epidermal tissue (i.e., skin). When conducting multiple applications of compound to the skin, the surface of the skin is gently washed between applications with distilled water or soap to remove deposits that might be adsorbed on the surface of the skin. Additionally, in some applications, multi-chamber enclosure 100 is used to test solutions of different densities (including highly-viscous creams).

As previously described, membrane 222 can be prepared from model animal tissues, artificial tissues, and tissues with cells attached from different cell lines. Live tissues can be used immediately after the extraction from the animal or, alternatively, prepackaged in preservation solution (buffer, cell or tissue medium) and kept at or below 4° C. (see, H. Burgmann et al., Transplant. Proc. 24:1085-1086 (1992); A. R. Muller et al., Transplantation. 57:649-655 (1994); F. G. Rodriguez et al., J. Invest. Surg. 7:439-451 (1994); S. Massberg et l., Brit. J. Surg. 85:127-133 (1998)).

Some tissues, such as skin for example, can be used for studies after long-term storage at −20° C. (see, B. W. Barry. Dermatological Formulations. Percutaneous Absorption. Marcel Dekker, Inc. New York, Basel, 1983; S. M. Harrison et al., J. Pharm. Pharmacol. 36:261-262 (1984)). This presents the opportunity for streamlining high-throughput-testing processes on preserved samples of these tissues.

When considering cell lines for oral absorption studies, the Caco-2 cell line is usually a preferred choice. Cells are routinely cultured for compound uptake studies in cell culture plates on semi-permeable membranes (see, L. S. L. Gan & D. R. Thakker. Adv. Drug Deliv. 23:77-98 (1997); F. Delie & W. Rubas. Crit. Rev. Ther. Drug Carrier Syst. 14:221-286 (1997)). After cell confluency, a membrane having attached cells is installed between adjacent individual chambers (e.g., either by direct mounting or via a membrane-holding assembly, as previously described). In both cases, cells should face supply chamber 102, thereby imitating the compound transport route that occurs in the intestine from the mucosal surface to the serosal surface.

Using electrodes (e.g., see FIG. 8, electrodes 862) that are disposed in both supply chamber 102 and receiving chamber 112, a potential difference and currents can be measured across membrane 222 using the well-known Ussing/Zehrans voltage/current clamping technique.

Possessing a thorough understanding of the site specificity of absorption is important for optimizing oral drug delivery. For site-specificity studies, it is necessary to use tissues from different locations in the same experiment. For example, to study the gradient of compound-membrane interactions in the gastrointestinal tract, tissue ought to be prepared from different parts of the gastro-intestinal tract. Multi-chamber enclosure 100 can accommodate tissue samples from all portions of the gastro-intestinal tract, including the esophagus, stomach, small intestine and large intestine.

On the other hand, to reduce the effect of tissue variability [due to intestinal absorption gradient], small-size samples of tissue are advantageously used in multi-chamber enclosure 100. As previously described, membrane (tissue) samples, which have a diameter that is in the range of about 0.25 inches to about 0.5 inches, can be prepared in large quantities (simultaneously), using, for example, membrane holding cassette 330 (see, FIG. 3).

It will be appreciated that tissue can be attached to multiple membrane holding frames 224 simultaneously along cassette 330 using a technique such as stamping, forming or cutting. In this manner, the absorption parameters of various compounds can be determined for almost every centimeter of intestine.

Using multi-chamber enclosure 100, compound-absorption studies can be conducted on tissues from various species (e.g., rodents, farm animals, etc.) and from animals of different age groups. The only parameter that is likely to change is the diameter of the membrane holding frame 224, as might be required to accommodate tissues from different-size animals. If it is desirable or otherwise necessary to reduce the thickness, for example, of intestinal tissue, its mucosa can be stripped from underlying tissue layers before the tissue is mounted onto membrane holding frame 224.

In addition to its utility for studying compound-tissue interactions, multi-chamber enclosure 100 in accordance with the illustrative embodiment of the present invention is also useful for studying compound-compound interactions during absorption. These interactions are important since they are known, in some cases, to inhibit or enhance absorption. (For nutrient-nutrient, and nutrient-nutraceutical interactions and their affect on compound absorption, see, e.g., A. M. Ugolev et al., Brit. J. Nutr. 34:205-220 (1976); H. McCoy & M. A. Kenny. Magnesium Res. 9:185-203 (1996); C. R. Lynch. Nutr. Rev. 55:102-1010 (1997)). Furthermore, compound-compound interactions can affect organism immune functions (see, e.g., K. S. Kubena & D. N. McMurray. J. Amer. Diet. Assoc. 96:1156-1164 (1996)).

Perhaps more important than nutrient-nutrient and nutrient-nutraceutical interactions are drug-nutrient, drug-nutraceutical and especially drug-drug interactions (i.e., pharmaceutical synergism or antagonism). These types of interactions can decrease drug absorption, make some portion of the drug unavailable for absorption, or even increase a drug's toxic effects (see, e.g., R. R. Levine et al., Pharmacology. Drug Actions and Reactions. $6^{th}$ edition. The Parthenon Publishing Group. New York, London, 2000; B. N. Singh. Clin. Pharmacokinet. 37:213-255 (1999)).

To study compound interactions during their absorption using multi-chamber enclosure 100, the tested compound (e.g., nutrient, drug, nutraceutical, cosmetic, cosmeceutical, or other xenobiotics, etc.) is injected alone or in different combinations with another compound (modifier) into supply chamber 102 and the concentration of the compound under investigation is monitored in receiving chamber 112. The compounds under investigation and modifiers can belong to the same or different classes. That is, the compounds and modifiers are individually selected from the group consisting of, for example, drugs, nutrients, nutraceuticals, cosmetics, cosmeceuticals and xenobiotics, etc. In this manner, multi-chamber enclosure 100 can be used to study the following interactions:

| | |
|---|---|
| drug-drug | drug-nutrient |
| drug-neutraceuticals | nutrient-nutrient, |
| nutraceutical-nutraceutical | nutrient-neutraceuticals |
| cosmetics-cosmetics | cosmeceutical-cosmeceutical |
| cosmetics-cosmeceuticals | xenobiotic interactions |

Using a plurality of chambers, such as with the variations of the illustrative embodiment depicted in FIGS. 9 through 12, enables simultaneous screening of different compound-compound combinations.

The same multi-chamber enclosure can be used for testing compound absorption sans modifier and in the presence of a modifier. In the latter case, compound absorption sans modifier is typically evaluated first as described above, then, after an appropriate wash, compound absorption in the presence of a modifier is tested. This methodology reduces the effect of membrane variability on compound absorption.

Multi-chamber enclosure 100 in accordance with the illustrative embodiment of the present invention has a variety of uses in addition to those already described. For example, a detailed analysis of compound concentration in supply chamber 102, in tissue (i.e., membrane 222), and in receiving chamber 112 is important to evaluate compound transport mechanisms, especially to differentiate between passive and active transport mechanisms. These analyses are readily performed using fluid control system 1216 in conjunction with multi-chamber enclosure 100.

Furthermore, analysis of compound concentrations in the supply and receiving compartments, as well as in tissue (i.e., membrane 222), is necessary to separately evaluate compound transport through apical membranes and baso-lateral membranes in polarized epithelial cells. The ratio between compound concentration in tissue and in supply chamber 102 characterizes the intensity of compound transport through the apical membrane, and the ratio between compound concentrations in tissue and in receiving chamber 112 is used to evaluate baso-lateral membrane transport.

Additionally, multiple samples can be obtained from multi-chamber enclosure 100 during an absorption cycle, as is necessary for kinetics studies of compound absorption. Also, the ability to run a plurality of multi-chamber enclosures 100 in parallel is advantageous for a comparative analysis of the effect of compound concentration and incubation time on the compound interaction with membrane 222.

Yet another use for multi-chamber enclosure 100 is to evaluate first-pass metabolism in metabolically-active tissues. First-pass metabolism follows absorption and is believed to contribute to the poor oral bio-availability of some drugs in the intestine after their oral administration. To perform this type of evaluation using multi-chamber enclosure 100, media from both the supply and receiving chambers, as well as the tissue (ie., membrane 222) is removed after incubation and analyzed for metabolite concentration.

Moreover, multi-chamber enclosure 100 can be used to study the role of cell excretion systems in compound absorption, given the presence of a P-glycoprotein pump located in the brush border of intestinal epithelial cells (see, e.g., F. Thiebaut et al., Proc. Natl. Acad. Sci. USA 84:7735-7738 (1987); L. Barthe et al., Fundam. Clin. Pharmacol. 13:154-168 (1999)). Specifically, the kinetics of compound absorption can be investigated in the absence and presence of P-glycoprotein inhibitors in supply chamber 102. The same approach is used to screen absorption enhancers and for conducting compound toxicity analysis.

It is to be understood that the above-described embodiment is merely illustrative of the present invention and that many variations of the above-described embodiment can be devised by one skilled in the art without departing from the scope of the invention. For example, rather than using two separate housings (e.g., 103 and 113, etc.) to form, in conjunction with a membrane, two separate chambers, a single housing can be used. In such an embodiment, a membrane, attached to a membrane-holding assembly, is inserted through a slot in the housing. It is therefore intended that such variations be included within the scope of the following claims and their equivalents.

We claim:

1. An article comprising:
   an enclosure defining a sealable volume that receives fluid, wherein said enclosure has a first aperture and a second aperture;
   a membrane. wherein said membrane is disposed in the enclosure, and further wherein said membrane segregates the volume defined by the enclosure into a first chamber and a second chamber;
   a first feed fitting, wherein said first feed fitting is received by said first aperture;
   a first spring-biasing element, wherein said first spring-biasing element mechanically couples to said first feed fitting;
   a second feed fitting, wherein said second feed fitting is received by said second aperture; and
   a second spring-biasing element, wherein said second spring-biasing element mechanically couples to said second feed fitting; wherein:
   said first spring-biasing element, said first feed fitting, said first aperture, said second aperture, said second feed fitting and said second spring-biasing element are aligned along a first axis.

2. The article of claim 1 wherein:
   said first spring-biasing element exerts a first force;
   said second spring-biasing element exerts a second force; and
   said first force and said second force collectively place said enclosure in compression.

3. The article of claim 1 wherein said enclosure comprises a first housing and a second housing, wherein said first and second housing are coupled to one another.

4. The article of claim 3 wherein:
   said first housing has a first end and a second end;
   said first housing is relatively larger at said second end and relatively smaller at said first end;
   said second housing has a first end and a second end;
   said second housing is relatively larger at said second end and relatively smaller at said first end; and
   said first housing and said second housing engage one another at said relatively larger second ends.

5. The article of claim 4 wherein:
   said first aperture is disposed at said first end of said first housing; and
   said second aperture is disposed at said first end of said second housing.

6. The article of claim 5 wherein:
   said second end of said first housing is substantially open thereby defining a relatively large aperture compared to said first aperture at said first end of said first housing; and
   said second end of said second housing is substantially open thereby defining a relatively large aperture compared to said second aperture at said first end of said second housing.

7. The article of claim 4 wherein each of said first housing and said second housing have a conical shape.

8. The article of claim 6 wherein:
   said membrane is disposed between said first housing and said second housing proximal to said relatively large aperture of each of said first housing and said second housing; and
   said first chamber is defined within said first housing and said second chamber is defined within said second housing.

9. The article of claim 8 wherein said membrane is selected from the group consisting of live tissue, synthetic tissue and synthetic tissue with cells attached.

10. The article of claim 8 wherein:
    said first feed fitting has a first end and a second end;
    said first spring-biasing element couples to said first end of said first feed fitting;
    said second end of said first feed fitting has a first opening; and
    said second end of said first feed fitting is received by said first aperture of said enclosure so that said first opening communicates with said first chamber.

11. The article of claim 10 further comprising a tube, wherein said tube extends into said first chamber through said first opening of said first feed fitting.

12. The article of claim 11 further comprising a fluid control system, wherein:
    said fluid control system is coupled to said tube;
    said fluid control system supplies fluid to and receives fluid from said first chamber;
    and said fluid control system is coupled to analytical devices.

13. The article of claim 1, further comprising a frame, wherein:
    said frame has two spaced-apart rails;
    said first spring-biasing element is coupled to one of said spaced-apart rails; and
    said second spring-biasing element is coupled to the other of said spaced-apart rails.

14. An article comprising:
a first housing and a second housing, wherein said first housing and said second housing are coupled to one another, wherein:
said first housing has a first interior volume, a small aperture, and a large aperture;
said second housing has a second interior volume, a small aperture, and a large aperture; and
said first housing and said second housing are coupled proximal to said large apertures;
a first feed fitting, wherein said first feed fitting has an opening and said first feed fitting is received by said small aperture of said first housing;
a first plurality of tubes, wherein said first plurality of tubes pass through said opening in said first feed fitting and extend into said first interior volume of said first housing;
a second feed fitting, wherein said second feed fitting has an opening and said second feed fitting is received by said small aperture of said second housing;
a second plurality of tubes, wherein said second plurality of tubes pass through said opening in said second feed fitting and extend into said second interior volume of said second housing;
a first spring-biasing element that mechanically couples to said first feed fitting; and
a second spring-biasing element that mechanically couples to said second feed fitting.

15. The article of claim 14 further comprising a membrane, wherein:
said membrane is disposed between said first housing and said second housing;
said membrane and said first housing define a first chamber that comprises said first interior volume;
said membrane and said second housing define a second chamber that comprises said second interior volume; and
said membrane forms a seal between said first chamber and said second chamber.

16. The article of claim 15 further comprising:
a first vent, wherein said first vent is disposed in said first housing and vents said first chamber;
a second vent, wherein said second vent is disposed in said second housing vents said second chamber.

17. The article of claim 15 further comprising an electrode, wherein said electrode passes through said opening in said first feed fitting and extends into said first chamber.

18. The article of claim 15 further comprising a fluid control system, wherein:
said first plurality of tubes and said second plurality of tubes are coupled to said fluid control system;
said fluid control system supplies fluid to at least one of said first and second chambers;
said fluid control system receives fluid from at least one of said first and second chambers; and
said fluid control system is coupled to analysis devices and control devices.

19. The article of claim 14 further comprising a device for fixing each tube of said first plurality of tubes in a desired location and orientation within said first chamber.

20. The article of claim 14 further comprising a third housing, wherein:
said third housing has an interior volume; and
said third housing is flanked by and couples to said first housing and said second housing.

21. The article of claim 20 further comprising a first membrane and a second membrane, wherein:
said first membrane is disposed between said first housing and said third housing;
said first membrane and said first housing define a first chamber that comprises said first interior volume;
said second membrane is disposed between said second housing and said third housing;
said second membrane and said second housing define a second chamber that comprises said second interior volume;
said third housing, said first membrane, and said second membrane define a third chamber that comprises said third interior volume; and wherein:
said first membrane forms a seal between said first chamber and said third chamber; and
said second membrane forms a seal between said second chamber and said third chamber.

22. The article of claim 15 wherein said first housing, said second housing and said membrane collectively compose a first multi-chamber enclosure, and further comprising:
a second multi-chamber enclosure; and
a frame;
wherein said first multi-chamber enclosure and said second multi-chamber enclosure are mechanically coupled to said frame.

23. The article of claim 22 wherein:
said frame comprises a first rail and a second rail;
said first spring-biasing element is mechanically coupled to said first rail; and
said second spring-biasing element is mechanically coupled to said second rail.

24. The article of claim 22 further comprising a mother chamber, wherein said mother chamber receives said frame having said first multi-chamber enclosure and said second multi-chamber enclosure.

* * * * *